United States Patent [19]

Hillenbrand

[11] Patent Number: 5,235,848
[45] Date of Patent: Aug. 17, 1993

[54] THRUSTER TEST FIXTURE

[75] Inventor: Christopher F. Hillenbrand, Bristol, R.I.

[73] Assignee: The United States of America as represented by the Secretary of the Navy, Washington, D.C.

[21] Appl. No.: 800,785

[22] Filed: Nov. 27, 1991

[51] Int. Cl.⁵ .......................................... G01M 15/00
[52] U.S. Cl. ................................................ 73/117.4
[58] Field of Search .................. 73/117.4, 148, 147, 73/862.541, 112.4

[56] References Cited

U.S. PATENT DOCUMENTS

| | | | |
|---|---|---|---|
| 2,618,972 | 11/1952 | Leduc | 73/147 |
| 3,122,917 | 3/1964 | Ormond | 73/117.4 |
| 4,788,855 | 12/1988 | Laskody | 73/117.4 |

Primary Examiner—Jerry W. Myracle
Attorney, Agent, or Firm—Michael J. McGowan; Prithvi C. Lall; Michael F. Oglo

[57] ABSTRACT

The device to be tested is supported from a beam by two parallel links so the thrust direction remains perpendicular to the direction of gravity. Each link is connected to the beam by a tension transducer also oriented perpendicular to the direction of gravity.

3 Claims, 1 Drawing Sheet

THRUSTER TEST FIXTURE

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

(1) Field of the Invention

This invention relates generally to test fixtures for measuring the thrust developed by a device which includes some sort of rotating propeller or impeller designed to draw a fluid medium in one end of the device and to eject the fluid medium out of the opposite end of the device.

More specifically, this invention relates to a test fixture which includes a fixed frame, and as part of the fixed frame further includes a generally horizontally extending beam oriented in spaced parallel relationship to the direction of thrust to be measured.

(2) Description of Prior Art

The use of a load cell to measure the thrust of a propulsion device supported on a pair of parallel links is known from U.S. Pat. No. 3,122,917. However, this patent does not show a load cell provided parallel to the direction of thrust as those links move in response to the thrust.

SUMMARY OF THE INVENTION

In a preferred embodiment the device and the frame structure supporting it are submerged under water, and electrical leads connect the transducers to a computer provided outside of the water environment for the test fixture. Means is provided for controlling the power output or thrust of the device at a location remote from the device itself.

First and second parallel links are pivotably mounted in the beam and pivotably support the device at end portions of the links opposite the pivoted end portions.

Restraining means is provided for these links in the form of transducers extending between the links and a fixed abutment provided in the frame, and these transducers produces output signals proportional to the degree of motion of the links as achieved against the action of the restraining means.

Means is provided for remotely recording the output of these transducers, and also for remotely controlling the operation of the thruster device itself.

The aim of the present invention is to provide a test fixture for evaluating the thrust output of submersible devices of the type used in subsurface remotely controlled vehicles. The force vector of the thruster can be measured by utilizing transducers preferably in the form of strain gage assemblies, and thrust can be measured either in the positive or negative direction along a horizontal axis, and this horizontal orientation for the axis of thrust assures that the influence of gravity on the system is eliminated or at least greatly reduced.

DESCRIPTION OF THE PREFERRED EMBODIMENT

Figure 1:
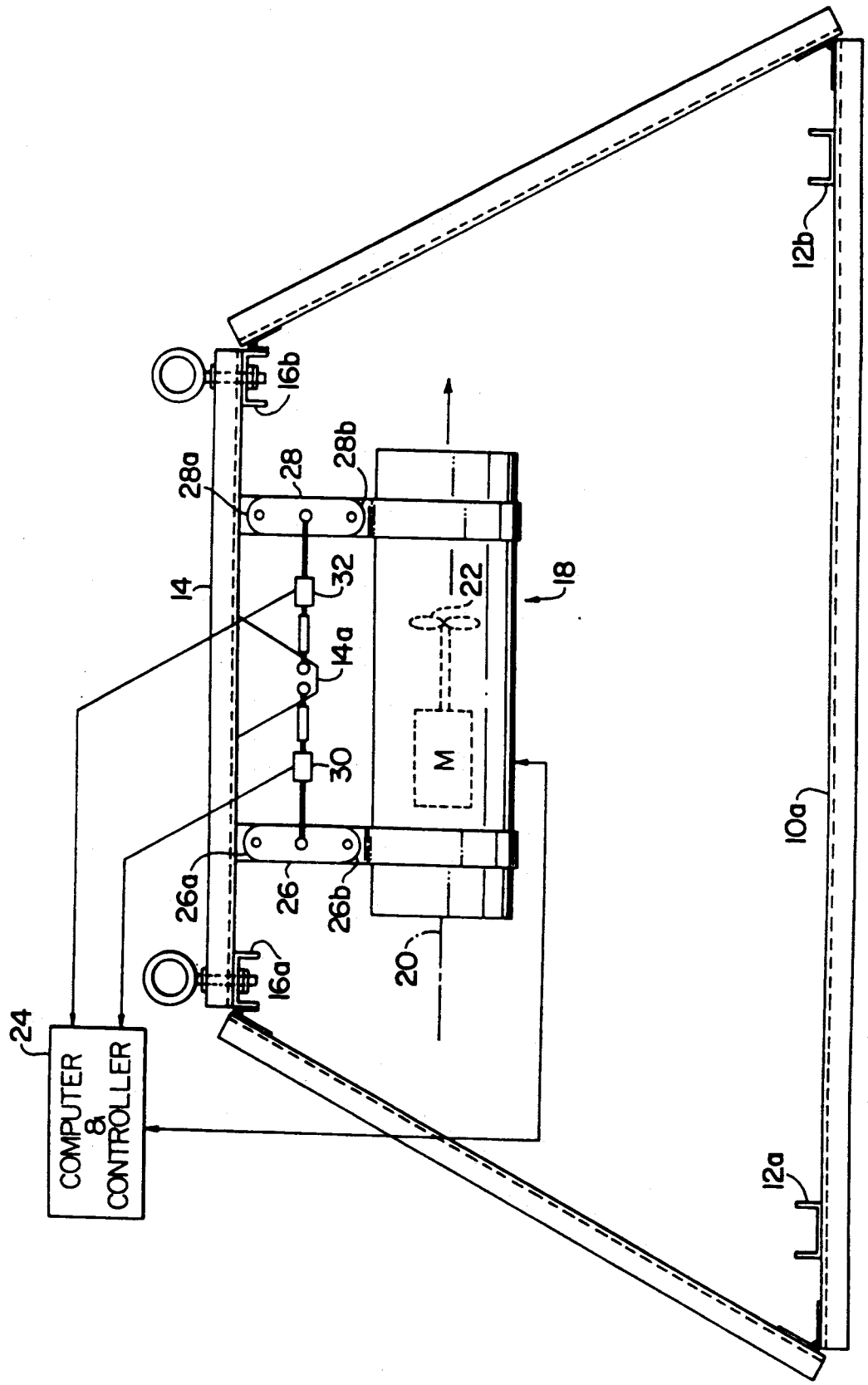
FIG. 1 shows a thruster device being tested in its associated supporting means for restricting the device to generating thrust in the horizontal direction and the means for restraining the device including load cells or transducers which provide output signals proportional to limited motion of the thruster device itself.

Turning now to the drawing in greater detail, a fixed frame has a base portion in the form of longitudinally extending legs 10a which are adapted to rest on a floor, as for example the floor of a tank in which the device is to be tested. These legs 10a are held in spaced parallel relationship to one another by cross bars 12a and 12b. A horizontally extending beam 14 is supported above the base legs 10a by U-shaped frame members 16a and 16b. These frame members 16a and 16b together with the base legs 10a and cross bars 12a and 12b are preferably fabricated from a welded up series of channels, gusset plates may be provided for increasing the rigidity of the resulting frame structure.

In summary, the present invention provides for a test fixture which includes a fixed frame including at least one horizontally extending beam 14. The beam 14 is preferably oriented parallel to the direction of the thrust to be measured, in this case parallel to the horizontal axis of the thruster device which is indicated generally at 18. The direction of the thrust will be along the line 20, and the thruster device 18 may comprise a ducted impeller system where one or more propellers such as that indicated generally at 22 are driven by one or more motors such as that indicated at M. In such a device the motor's speed will be proportional to the propeller's thrust.

The thruster device 18 may comprise a submersible system of the type sometimes generally provided in unmanned submersible vehicles. The thruster motor M may be electrically driven, and as shown is controlled from a computer/controller indicated generally at 24. The electrical energy supplied to the motor will be related to the actual thrust by an efficiency factor.

In accordance with the present invention the thruster device 18 is supported in the fixed frame on the horizontally extending beam 14. First and second support links 26 and 28 are provided to support the thruster device 18 from the beam 14. The upper ends of these links are pivotably mounted to the beam as indicated generally at 26a and 28a respectively. The lower ends 26b and 28b of the links pivotably support the thruster device 18. The thruster device 18 remains in parallel relationship to the horizontal beam 14 by virtue of the fact that the links 26 and 28 are parallel to one another, and by virtue of the fact that these links 26 and 28 are equal in length. This geometry assures that the gravitational effects on the system are minimized.

Restraining means is provided for these links 26 and 28, and said restraining means preferably comprises a pair of oppositely directed strain gage type transducers 30 and 32 which are adapted to provide electrical output signals proportional to the tension forces exerted on them. Each transducer comprises a strain gage assembly which provides electrical output signals proportional to the strain experienced by each assembly resulting from the stresses imposed upon each strain gage assembly due to the thrust of the device 18 as exerted on each of these assemblies through the links 26 and 28.

The outputs from these tension force transducers 30 and 32 are provided to the computer 24. Each transducer is provided between an abutment 14a on the beam 14 and one of the two links 26 and 28 supporting the thruster device 18 as shown. Thus, the transducers, or strain gage assemblies, serve to restrict motion of the thruster device 18 resulting from thrust created through the motorized impeller system described previously. Depending upon the force required to so restrict the pivotal motion of the thruster device 18 output signals are provided by these transducers to feed input data to the computer 24 which input data is related to the thrust being produced by the device 18.

Each transducer, or strain gage assembly is connected to an associated link by a cable segment capable of transmitting tension, but not compression. Cable segments may also connect each transducer to the beam abutment 14a for the same reason. These cable segments are preferably preloaded in tension by suitable means such as the turnbuckles shown next to the transducers.

As so constructed and arranged only tension strain is detected, and only by one transducer (depending upon thrust direction).

What is claimed is:

1. A test fixture for measuring thrust developed by a device designed to produce thrust in at least one direction, said test fixture comprising:
   a fixed frame including a beam oriented parallel to the direction of the thrust to be measured and spaced from said thrust direction;
   first and second support links, each link having one end pivotably mounted to said beam, and having an opposite end pivotably supporting said device, said links being parallel to one another and of equivalent lengths so that the direction of the thrust remains substantially parallel to them and said beam further including an abutment flange located between said first link and said second link; and
   strain transducer means provided between at least one of said links and fixed frame to provide an electrical output signal proportional to the tension force absorbed by said strain transducer means, said strain transducer means further connected between said abutment flange and at least one of said links.

2. A text fixture for measuring thrust developed by a device designed to produce thrust in at least one direction, said test fixture comprising; a fixed frame including a beam oriented parallel to the direction of thrust to be measured and spaced from said thrust direction; said beam including an abutment flange; first and second support links, each having one end pivotably mounted on said beam, and having an opposite end pivotably supporting said device, said links being parallel to one another and of equivalent length so that the direction of thrust remains substantially parallel to said beam; restraining means for said links including strain transducer means capable of producing electrical output signals proportional to the force absorbed by said restraining means, and said transducer means including two tension transducers provided one between each of said first and second links and said abutment flange, each tension transducer being oriented parallel to said beam and to said thrust direction.

3. The combination according to claim 2 wherein each tension transducer includes a segment capable of transmitting tension only (no compression).

* * * * *